(12) United States Patent
Mitani et al.

(10) Patent No.: US 12,224,688 B2
(45) Date of Patent: Feb. 11, 2025

(54) AIRCRAFT

(71) Applicant: HONDA MOTOR CO., LTD., Tokyo (JP)

(72) Inventors: Manabu Mitani, Wako (JP); Tomohiro Fukazu, Wako (JP); Yuichi Fukuchi, Wako (JP); Masashi Eto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/192,151

(22) Filed: Mar. 29, 2023

(65) Prior Publication Data
US 2023/0318505 A1 Oct. 5, 2023

(30) Foreign Application Priority Data

Mar. 31, 2022 (JP) .................................. 2022-058019

(51) Int. Cl.
| | |
|---|---|
| *H02P 27/06* | (2006.01) |
| *B60L 50/00* | (2019.01) |
| *B64D 27/24* | (2024.01) |
| *H02P 25/16* | (2006.01) |
| *B64C 29/00* | (2006.01) |

(52) U.S. Cl.
CPC .............. *H02P 27/06* (2013.01); *B60L 50/00* (2019.02); *B64D 27/24* (2013.01); *H02P 25/16* (2013.01); *B60L 2200/10* (2013.01); *B60L 2210/30* (2013.01); *B60L 2210/44* (2013.01); *B64C 29/0008* (2013.01)

(58) Field of Classification Search
None
See application file for complete search history.

(56) References Cited

U.S. PATENT DOCUMENTS

| | | | |
|---|---|---|---|
| 2018/0118356 A1* | 5/2018 | Armstrong | ............. B63H 23/24 |
| 2020/0115045 A1 | 4/2020 | Mermoz et al. | |
| 2020/0148372 A1* | 5/2020 | Long | ....................... B64D 27/02 |
| 2022/0355944 A1 | 11/2022 | Biaujaud | |

FOREIGN PATENT DOCUMENTS

WO 2021/089948 A1 5/2021

* cited by examiner

*Primary Examiner* — Jared Fureman
*Assistant Examiner* — Aqeel H Bukhari
(74) *Attorney, Agent, or Firm* — Rankin, Hill & Clark LLP

(57) ABSTRACT

An aircraft includes: rotors each driven by an electric motor; a PCU that converts AC power output from a generator into DC power; an inverter that converts DC power supplied from the PCU into AC power and outputs the AC power to the electric motor; a DC wire that connects the PCU and the inverter; and an AC wire that connects the inverter and the electric motor. The AC wire is disposed in a direction orthogonal to a direction in which rotation shafts of the generator and a gas turbine extend.

3 Claims, 3 Drawing Sheets

AIRCRAFT

CROSS-REFERENCE TO RELATED APPLICATIONS

This application is based upon and claims the benefit of priority from Japanese Patent Application No. 2022-058019 filed on Mar. 31, 2022, the contents of which are incorporated herein by reference.

BACKGROUND OF THE INVENTION

Field of the Invention

The present invention relates to an aircraft.

Description of the Related Art

US 2020/0115045 A1 discloses an electric multirotor aircraft.

SUMMARY OF THE INVENTION

The electric multirotor aircraft disclosed in US 2020/0115045 A1 includes a plurality of electric motors that drive a plurality of rotors, respectively. The electric motor is supplied with electrical power from an electrical energy source. The electrical energy source includes an engine, a generator, a power storage device, and an energy management device.

In a case where fragments are scattered by a rotor burst of an engine or generator, there is a possibility that wires connecting some of the electric motors and the electrical energy source are damaged by the scattered fragments and short-circuited. In this case, there is a problem in that electric power is not supplied to other electric motors, and thrust cannot be secured.

An object of the present invention is to solve the above-mentioned problem.

According to an aspect of the present invention, there is provided an aircraft comprising: a generator configured to generate electric power; an engine configured to drive the generator; an electric motor configured to operate with alternating current electric power; a rotor driven by the electric motor and configured to generate thrust; a power control unit configured to convert alternating current electric power output from the generator into direct current electric power; an inverter configured to convert the direct current electric power supplied from the power control unit into alternating current electric power and output the alternating current electric power to the electric motor; a direct current wire configured to connect the power control unit and the inverter; and an alternating current wire configured to connect the inverter and the electric motor, wherein the alternating current wire is disposed and the direct current wire is not disposed, in a direction extending from the generator orthogonally to a direction in which a rotation shaft of the generator extends, or in a direction extending from the engine orthogonally to a direction in which a rotation shaft of the engine extends.

According to the present invention, thrust can be ensured even when fragments are scattered by a rotor burst of an engine or generator.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

First Embodiment

[Configuration of Aircraft]

Figure 1:
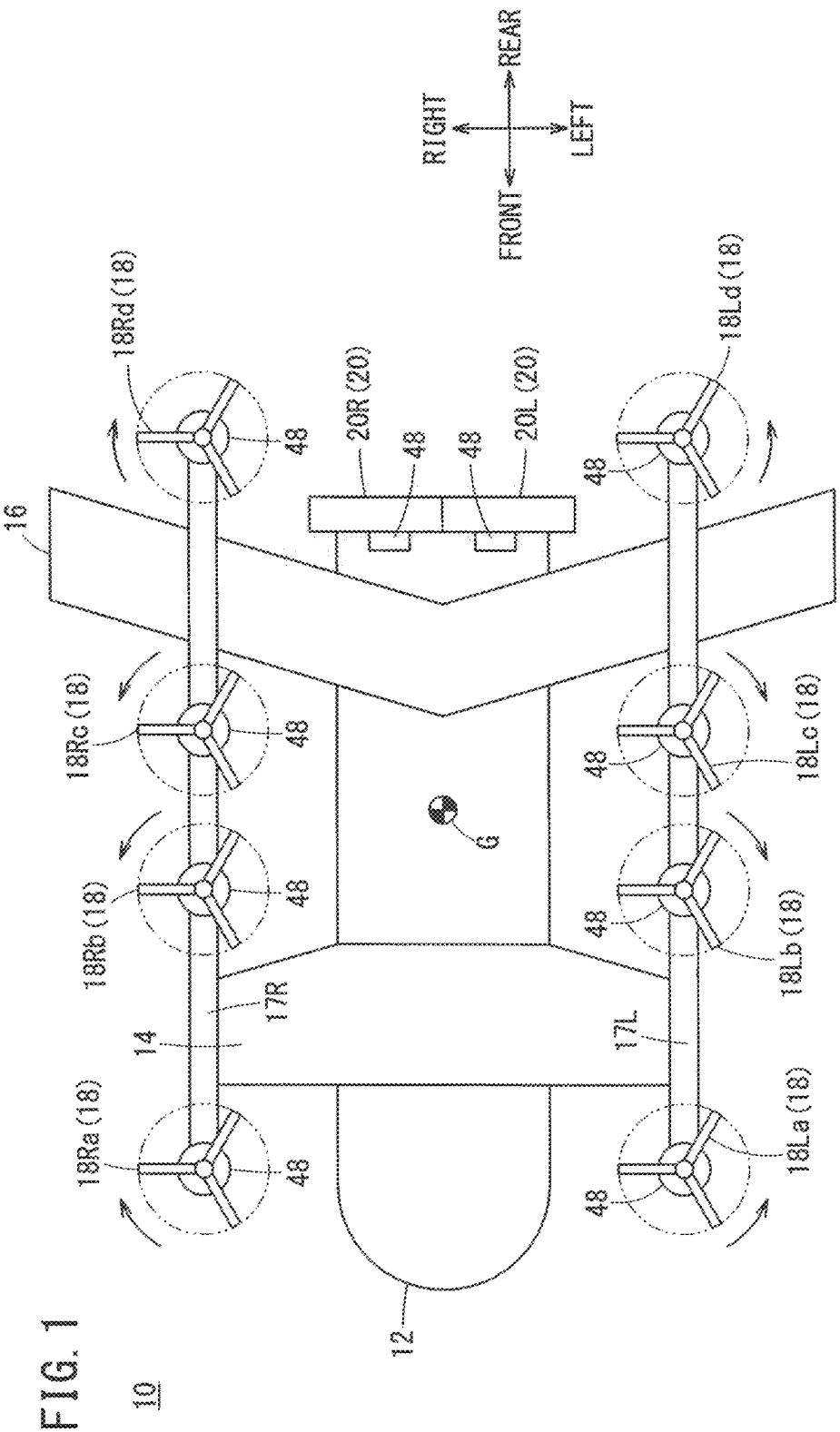
FIG. 1 is a schematic diagram of an aircraft.

FIG. 1 is a schematic diagram of an aircraft 10. The aircraft 10 of the present embodiment is an electric vertical take-off and landing aircraft (eVTOL aircraft). In the aircraft 10, rotors are driven by electric motors. The aircraft 10 generates vertical thrust and horizontal thrust by the rotors. Further, the aircraft 10 is a hybrid aircraft. The aircraft 10 includes a generator and a battery as power sources of the electric motor. In the aircraft 10, electric power generated by the generator is supplied to the electric motor. When the electric power generated by the generator is insufficient with respect to the required electric power, the electric power stored in the battery is supplied to the electric motor.

The aircraft 10 includes a fuselage 12. The fuselage 12 is provided with a cockpit, a cabin, and the like. A pilot rides in the cockpit and controls the aircraft 10. Passengers and the like ride in the cabin. The aircraft 10 may be automatically controlled.

The aircraft 10 includes a front wing 14 and a rear wing 16. When the aircraft 10 moves forward, lift is generated in each of the front wing 14 and the rear wing 16.

The aircraft 10 includes a boom 17L and a boom 17R. The boom 17L and the boom 17R are fixed to the front wing 14 and the rear wing 16. The boom 17L and the boom 17R extend in the front-rear direction of the aircraft 10. The boom 17L is provided on the left side of the center of gravity G of the fuselage 12, and the boom 17R is provided on the right side of the center of gravity G of the fuselage 12.

The aircraft 10 includes eight VTOL rotors 18. The eight VTOL rotors 18 are a rotor 18La, a rotor 18Lb, a rotor 18Lc, a rotor 18Ld, a rotor 18Ra, a rotor 18Rb, a rotor 18Rc, and a rotor 18Rd.

The rotor 18La, the rotor 18Lb, the rotor 18Lc, and the rotor 18Ld are attached to the boom 17L. The rotor 18Ra, the rotor 18Rb, the rotor 18Rc, and the rotor 18Rd are attached to the boom 17R.

The rotation shaft of each VTOL rotor 18 extends in the up-down direction of the fuselage 12. The thrust of each VTOL rotor 18 is controlled by adjusting the rotational speed of the rotor and the pitch angle of the blades. Each VTOL rotor 18 is used during vertical take-off, during transition from vertical take-off to cruising, during transition from cruising to vertical landing, during vertical landing, during hovering, and the like. Further, each VTOL rotor 18 is used during attitude control.

Lift thrust is generated by controlling the thrust of each VTOL rotor 18. The lift thrust indicates vertical thrust. The thrust of each VTOL rotor 18 is controlled to cause a roll moment, a pitch moment, and a yaw moment to act on the fuselage 12.

The aircraft 10 includes two cruise rotors 20. The two cruise rotors 20 are a rotor 20L and a rotor 20R. The rotor 20L and the rotor 20R are attached to the rear portion of the fuselage 12.

The rotation shaft of each cruise rotor 20 extends in the front-rear direction of the fuselage 12. The thrust of each cruise rotor 20 is controlled by adjusting the rotational speed of the rotor and the pitch angle of the blades. Each cruise rotor 20 is used during transition from vertical take-off to cruising, during cruising, during transition from cruising to vertical landing, and the like.

Cruise thrust is generated by controlling the thrust of each cruise rotor 20. The cruise thrust indicates horizontal thrust.

[Configuration of Power Supply System]

Figure 2:
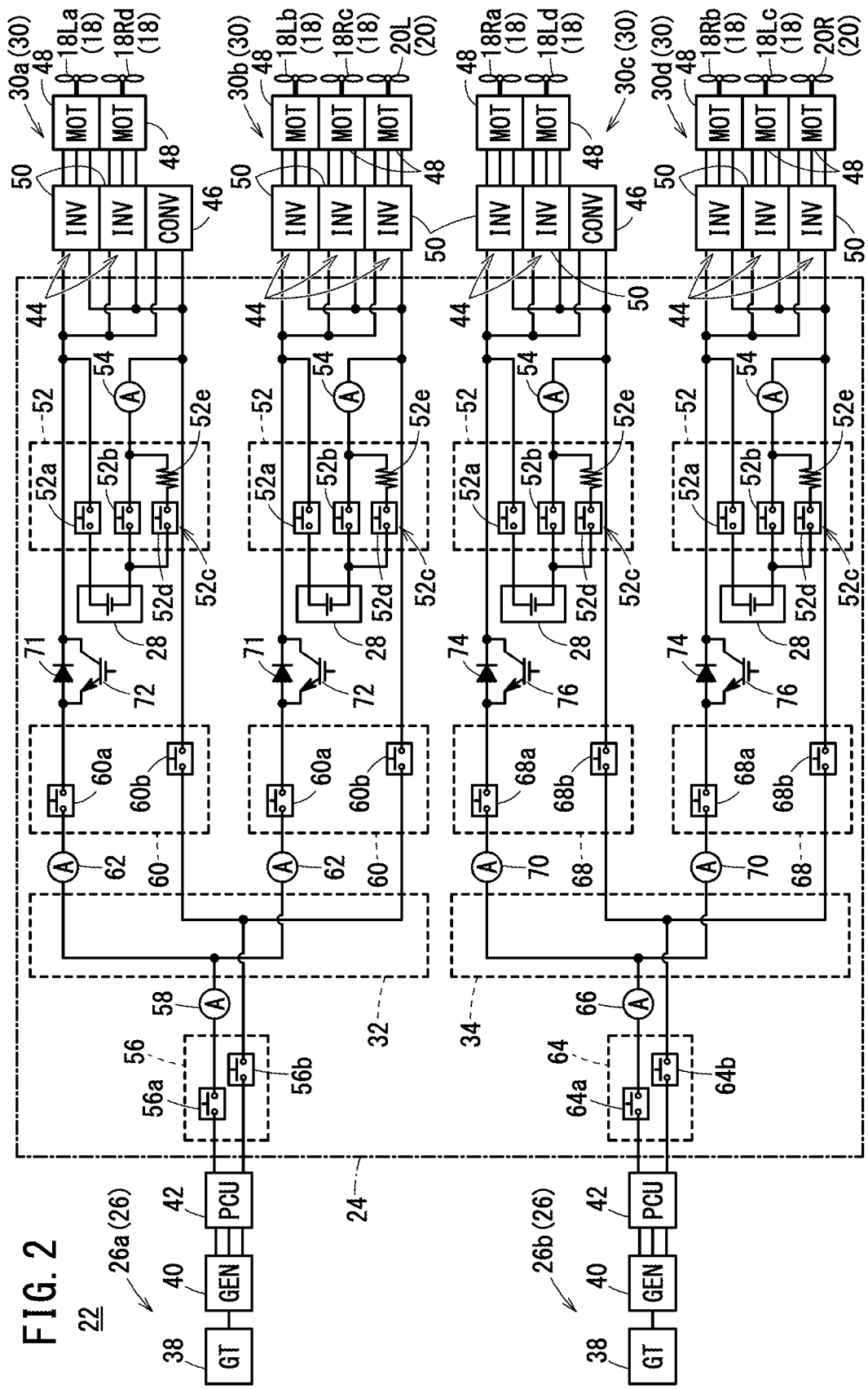
FIG. 2 is a schematic diagram showing a configuration of a power supply system.

FIG. 2 is a schematic diagram showing a configuration of a power supply system 22.

The power supply system 22 includes a power supply circuit 24, two power generation units 26, and four batteries 28. The power supply system 22 supplies electric power to four drive modules 30. The two power generation units 26 indicate a first power generation unit 26a, and a second power generation unit 26b. The four drive modules 30 indicate a first drive module 30a, a second drive module 30b, a third drive module 30c, and a fourth drive module 30d.

The power supply circuit 24 includes a first power transmission path 32 and a second power transmission path 34. The first power transmission path 32 supplies electric power from the first power generation unit 26a to each of the first drive module 30a and the second drive module 30b. The second power transmission path 34 supplies electric power from the second power generation unit 26b to each of the third drive module 30c and the fourth drive module 30d. Although the first power transmission path 32 and the second power transmission path 34 are not connected to each other in the present embodiment, a circuit that connects the first power transmission path 32 and the second power transmission path 34 may be provided. In this case, a contactor may be provided in the circuit, and the contactor may switch between a state in which the first power transmission path 32 and the second power transmission path 34 are connected to each other, and a state in which the first power transmission path 32 and the second power transmission path 34 are disconnected from each other.

Electric power stored in each battery 28 is supplied to each drive module 30, separately from the electric power generated by each power generation unit 26.

Each power generation unit 26 includes a gas turbine 38, a generator 40, and a power control unit (hereinafter referred to as PCU) 42. The gas turbine 38 drives the generator 40. As a result, the generator 40 generates electric power. The PCU 42 converts the AC power generated by the generator 40 into DC power, and outputs the DC power to the power supply circuit 24.

When starting the gas turbine 38, the PCU 42 converts the DC power supplied from the power supply circuit 24 into AC power, and outputs the AC power to the generator 40. The generator 40 is operated by the electric power input from the PCU 42, and the generator 40 drives the gas turbine 38.

Each of the first drive module 30a and the third drive module 30c includes two drive units 44 and one converter 46. Each of the second drive module 30b and the fourth drive module 30d includes three drive units 44. Each VTOL rotor 18 or each cruise rotor 20 is driven by the drive unit 44.

Each drive unit 44 includes an electric motor 48 and an inverter 50. The electric motor 48 is a three phase motor. Each VTOL rotor 18 is coupled to the output shaft of each electric motor 48. Each cruise rotor 20 is coupled to the output shaft of each electric motor 48. The inverter 50 includes semiconductor switching elements such as insulated gate bipolar transistors (IGBTs). The inverter 50 converts the DC power supplied from the power supply circuit 24 into three phase AC power, and outputs the three phase AC power to the electric motor 48.

The semiconductor switching elements in the inverter 50 are controlled by a controller (not shown). The controller is supplied with electric power from a low-voltage battery (not shown).

The converter 46 steps down the voltage of the DC power supplied from the power supply circuit 24, and outputs the stepped-down power to a device operated by DC power. The device operated by DC power is, for example, a cooling device that cools the PCU 42, the inverter 50, and the like. The electric power whose voltage has been stepped down by the converter 46 may be supplied to the controller described above.

The battery 28 is connected to each drive module 30. The battery 28 is a high-voltage battery provided separately from the low-voltage battery described above. A contactor unit 52 is provided between each battery 28 and each drive module 30. Each contactor unit 52 includes a contactor 52a, a contactor 52b, and a precharge circuit 52c. The contactor 52a is provided on a positive wire that connects each battery 28 and each drive module 30. The contactor 52b is provided on a negative wire that connects each battery 28 and each drive module 30. The precharge circuit 52c is provided in parallel with the contactor 52b. The precharge circuit 52c includes a contactor 52d and a resistor 52e. A current sensor 54 is provided on the negative wire that connects each battery 28 and each drive module 30.

Each contactor unit 52 switches between a conduction state and an interruption state, between each battery 28 and each drive module 30. The conduction state is a state in which the flow of current is not interrupted by the contactor unit 52, and thus current flows. The interruption state is a state in which the flow of current is interrupted by the contactor unit 52.

Each contactor unit 52 may include only the contactor 52b and the precharge circuit 52c. The precharge circuit 52c may be provided in parallel with the contactor 52a. In this case, each contactor unit 52 may include only the contactor 52a and the precharge circuit 52c. The power supply system 22 may not include the battery 28 and the contactor unit 52.

The power supply circuit 24 includes a contactor unit 56. The contactor unit 56 is provided between the power generation unit 26 and the first power transmission path 32. The contactor unit 56 includes a contactor 56a and a contactor 56b. The contactor 56a is provided on a positive wire that connects the power generation unit 26 and the first power transmission path 32. The contactor 56b is provided on a negative wire that connects the power generation unit 26 and the first power transmission path 32. A current sensor 58 is provided between the contactor 56a and the first power transmission path 32. The contactor unit 56 may include only one of the contactor 56a or the contactor 56b.

The contactor unit 56 switches between the conduction state and the interruption state, between each power generation unit 26 and the first power transmission path 32.

The power supply circuit 24 includes two contactor units 60. Each contactor unit 60 is provided between each drive module 30 and the first power transmission path 32. Each contactor unit 60 includes a contactor 60a and a contactor 60b. Each contactor 60a is provided on a positive wire that connects each drive module 30 and the first power transmission path 32. Each contactor 60b is provided on a negative wire that connects each drive module 30 and the first power transmission path 32. A current sensor 62 is provided between each contactor 60a and the first power transmission path 32.

Each contactor unit 60 may include only one of the contactor 60a or the contactor 60b. When the contactor unit 56 includes only the contactor 56a, each contactor unit 60 preferably includes only the contactor 60b. When the contactor unit 56 includes only the contactor 56b, each contactor unit 60 preferably includes only the contactor 60a.

Each contactor unit 60 switches between the conduction state and the interruption state, between each drive module 30 and the first power transmission path 32.

The power supply circuit 24 includes a contactor unit 64. The contactor unit 64 is provided between the power generation unit 26 and the second power transmission path 34. The contactor unit 64 includes a contactor 64a and a contactor 64b. The contactor 64a is provided on a positive wire that connects the power generation unit 26 and the second power transmission path 34. The contactor 64b is provided on a negative wire that connects the power generation unit 26 and the second power transmission path 34. A current sensor 66 is provided between the contactor 64a and the second power transmission path 34. The contactor unit 64 may include only one of the contactor 64a or the contactor 64b.

The contactor unit 64 switches between the conduction state and the interruption state, between each power generation unit 26 and the second power transmission path 34.

The power supply circuit 24 includes two contactor units 68. Each contactor unit 68 is provided between each drive module 30 and the second power transmission path 34. Each contactor unit 68 includes a contactor 68a and a contactor 68b. Each contactor 68a is provided on the positive wire that connects the power generation unit 26 and the second power transmission path 34. Each contactor 68b is provided on the negative wire that connects the power generation unit 26 and the second power transmission path 34. A current sensor 70 is provided between each contactor 68a and the second power transmission path 34.

Each contactor unit 68 may include only one of the contactor 68a or the contactor 68b. When the contactor unit 64 includes only the contactor 64a, each contactor unit 68 preferably includes only the contactor 68b. When the contactor unit 64 includes only the contactor 64b, each contactor unit 68 preferably includes only the contactor 68a.

Each contactor unit 68 switches between the conduction state and the interruption state, between each drive module 30 and the second power transmission path 34.

A diode 71 is provided between the contactor 60a of each contactor unit 60 and each battery 28. An anode of each diode 71 is connected to the contactor 60a side, and a cathode thereof is connected to the battery 28 side. Each diode 71 allows electric power to be supplied from the first power transmission path 32 to each battery 28. Each diode 71 prevents electric power from being supplied from each battery 28 to the first power transmission path 32. Each battery 28 is charged with the electric power supplied from the first power generation unit 26a. In addition, when the first power transmission path 32 is short-circuited, electric power of each battery 28 is prevented from flowing to the first power transmission path 32. As a result, even when the first power transmission path 32 is short-circuited, electric power can be supplied from each battery 28 to the drive unit 44 and the converter 46 in each drive module 30.

A transistor 72 is provided in parallel with each diode 71. When the transistor 72 is ON, electric power is supplied from each battery 28 to the first power transmission path 32 while bypassing the diode 71. The generator 40 is operated by the electric power supplied from each battery 28, and the gas turbine 38 can be started.

Further, a diode 74 is provided between the contactor 68a of each contactor unit 68 and each battery 28. An anode of each diode 74 is connected to the contactor 68a, and a cathode thereof is connected to each battery 28. Each diode 74 allows electric power to be supplied from the second power transmission path 34 to each battery 28. Each diode 74 prevents electric power from being supplied from each battery 28 to the second power transmission path 34. Each battery 28 is charged with the electric power supplied from the second power generation unit 26b. In addition, when the second power transmission path 34 is short-circuited, electric power of each battery 28 is prevented from flowing to the second power transmission path 34. As a result, even when the second power transmission path 34 is short-circuited, electric power can be supplied from each battery 28 to the drive unit 44 and the converter 46 in each drive module 30.

A transistor 76 is provided in parallel with each diode 74. When the transistor 76 is ON, electric power is supplied from each battery 28 to the second power transmission path 34 while bypassing the diode 74. The generator 40 is operated by the electric power supplied from each battery 28, and the gas turbine 38 can be started.

[Wiring Structure in Aircraft]

Figure 3:
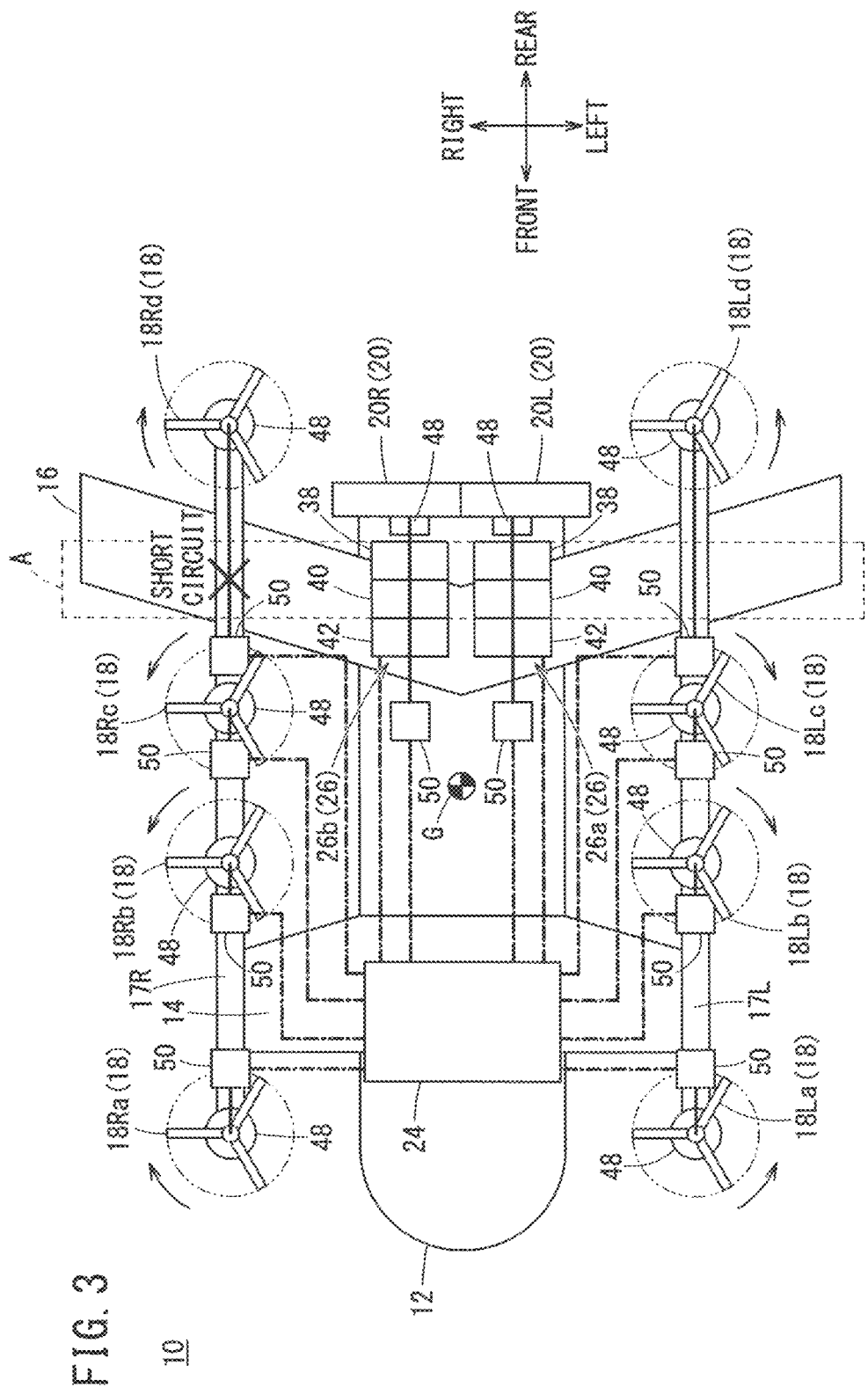
FIG. 3 is a diagram showing a wiring structure in the aircraft.

FIG. 3 is a diagram showing a wiring structure in the aircraft 10. In FIG. 3, thick dashed-dotted lines each indicate a DC wire, and thick solid lines each indicate an AC wire.

The AC power generated by each power generator 40 is converted into DC power by each PCU 42. The converted DC power is transmitted to the power supply circuit 24 through the DC wire.

The inverters 50 for controlling the electric motors 48 that drive the respective VTOL rotors 18 are provided at the boom 17L or the boom 17R. The DC power transmitted to the power supply circuit 24 is transmitted to each inverter 50 through the DC wire. The DC wire passes through the insides of the front wing 14, the boom 17L, and the boom 17R. The AC power output from each inverter 50 is transmitted to each electric motor 48 through the AC wire. The AC wire passes through the insides of the boom 17L and the boom 17R.

The inverters 50 for controlling the electric motors 48 that drive the respective cruise rotors 20 are provided in the fuselage 12. The DC power transmitted to the power supply circuit 24 is transmitted to each inverter 50 through the DC wire. The DC wire passes through the inside of the fuselage 12. The AC power output from each inverter 50 is transmitted to each electric motor 48 through the AC wire. The AC wire passes through the inside of the fuselage 12.

As shown in FIG. 3, each power generation unit 26 is disposed in the fuselage 12. Each power generation unit 26 is disposed rearward of the center of gravity G of the fuselage 12 in the front-rear direction. In each power generation unit 26, the gas turbine 38, the generator 40, and the PCU 42 are arranged in this order from the rear in the front-rear direction of the fuselage 12.

The rotor of each gas turbine 38 rotates about a rotation shaft extending parallel to the front-rear direction of the fuselage 12. The rotor of each generator 40 rotates about a rotation shaft extending parallel to the front-rear direction of the fuselage 12.

A region A indicated by a thin dotted line in FIG. 3 indicates a region extending in a direction orthogonal to the rotation shaft of each gas turbine 38 and in a direction orthogonal to the rotation shaft of each generator 40. Among the VTOL rotors 18, the rotor 18Ld and the rotor 18Rd are disposed rearward of the region A. The rotor 20L and the rotor 20R, which are the cruise rotors 20, are disposed rearward of the region A. The electric motors 48 for driving the rotor 18Ld, the rotor 18Rd, the rotor 20L, and the rotor 20R are also disposed rearward of the region A. In other words, each of the electric motors 48 for driving the rotor 18Ld, the rotor 18Rd, the rotor 20L, and the rotor 20R is disposed on the opposite side of each gas turbine 38 from the side where the PCU 42 is disposed. It can also be said that each of the electric motors 48 for driving the rotor 18Ld, the rotor 18Rd, the rotor 20L, and the rotor 20R is disposed on the opposite side of each generator 40 from the side where the PCU 42 is disposed. On the other hand, the inverters 50 for driving the electric motors 48 are disposed forward of the region A.

As a result, in the region A, the AC wires are disposed, but the DC wires are not disposed. If a rotor burst occurs in the gas turbine 38 or the generator 40, there is a high possibility that fragments are scattered in the range of the region A. In this case, the scattered fragments may cut the AC wire disposed in the region A, and the AC wire may be damaged and short-circuited.

The power supply system 22 includes a short-circuit detection device (not shown) that detects a short circuit of the AC wire that connects each inverter 50 and each electric motor 48. When the AC wire is short-circuited, the inverter 50 interrupts the connection between the short-circuited AC wire and the power supply circuit 24.

Advantageous Effects

In the aircraft 10, when thrust is lost in some of the VTOL rotors 18 and the cruise rotors 20, it is necessary to ensure thrust using the remaining rotors. Therefore, even when a short circuit occurs in a part of the wiring for supplying electric power from each power generation unit 26 to each electric motor 48 due to a rotor burst of the gas turbine 38 or the generator 40, it is required to maintain the supply of electric power to as many electric motors 48 as possible.

In the aircraft 10 of the present embodiment, the AC wires each connecting the inverter 50 and the electric motor 48 are disposed in the region A in which fragments are highly likely to scatter if a rotor burst occurs in the gas turbine 38 or the generator 40.

For example, as shown in FIG. 3, when the AC wire that connects the inverter 50 and the electric motor 48 that drives the rotor 18Rd is short-circuited, the inverter 50 interrupts the connection between the short-circuited AC wire and the power supply circuit 24. Interruption of the connection between the short-circuited AC wire and the power supply circuit 24 is performed by the semiconductor switching elements of the inverter 50. The semiconductor switching element can operate at a higher speed than a contactor or the like. Therefore, when the AC wire is cut off, the semiconductor switching elements can interrupt the connection between the AC wire and the power supply circuit 24 in an extremely short time. As a result, the power supply system 22 can maintain the supply of electric power to the other electric motors 48 and converters 46.

The connection between the short-circuited wire and the power supply circuit 24 may be interrupted by a fuse, a contactor, or the like. However, since the inverter 50 is configured by the switching elements, it can operate at a higher speed than a fuse, a contactor, or the like. Therefore, it is possible to shorten the time from when a short circuit of the wire is detected to when the connection between the short-circuited wire and the power supply circuit 24 is interrupted.

Note that the present invention is not limited to the above disclosure, and various modifications are possible without departing from the essence and gist of the present invention.

Invention Obtained from Embodiment

The invention that can be grasped from the above embodiment will be described below.

Provided is the aircraft (10) including: the generator (40) configured to generate electric power; the engine (38) configured to drive the generator; the electric motor (48) configured to operate with alternating current electric power; the rotor (18, 20) driven by the electric motor and configured to generate thrust; the power control unit (42) configured to convert alternating current electric power output from the generator into direct current electric power; the inverter (50) configured to convert the direct current electric power supplied from the power control unit into alternating current electric power and output the alternating current electric power to the electric motor; the direct current wire configured to connect the power control unit and the inverter; and the alternating current wire configured to connect the inverter and the electric motor, wherein the alternating current wire is disposed and the direct current wire is not disposed, in a direction extending from the generator orthogonally to a direction in which a rotation shaft of the generator extends, or in a direction extending from the engine orthogonally to a direction in which a rotation shaft of the engine extends. According to this feature, even when a rotor burst has occurred in the engine or the generator, thrust can be ensured.

In the above-described aircraft, the electric motor may be disposed on the opposite side of the generator or the engine from the side where the power control unit is disposed, in the direction in which the rotation shaft of the generator extends or in the direction in which the rotation shaft of the engine extends. According to this feature, even when a rotor burst has occurred in the engine or the generator, thrust can be ensured.

The invention claimed is:

1. An aircraft comprising:
   a generator configured to generate electric power;
   an engine configured to drive the generator;
   an electric motor configured to operate with alternating current electric power;
   a rotor driven by the electric motor and configured to generate thrust;
   a power control unit configured to convert alternating current electric power output from the generator into direct current electric power;
   an inverter configured to convert the direct current electric power supplied from the power control unit into alternating current electric power and output the alternating current electric power to the electric motor;
   a direct current wire configured to connect the power control unit and the inverter; and
   an alternating current wire configured to connect the inverter and the electric motor,
   wherein the alternating current wire connecting the inverter and the electric motor is disposed and the direct current wire connecting the power control unit and the inverter is not disposed, in a region located in a direction extending, from a position of the generator installed in the aircraft, orthogonally to a direction in which a rotation shaft of the generator extends, or in a region located in a direction extending, from the position of the engine installed in the aircraft, orthogonally to a direction in which a rotation shaft of the engine extends.

2. The aircraft according to claim 1, wherein
the electric motor is disposed on an opposite side of the generator or the engine from a side where the power control unit is disposed, in the direction in which the rotation shaft of the generator extends or the direction in which the rotation shaft of the engine extends.

3. The aircraft according to claim 1, wherein the aircraft comprises
a first electric motor and a second electric motor as the electric motor,
a first rotor and a second rotor as the rotor wherein the first rotor is driven by the first motor and the second rotor is driven by the second motor,
a first inverter and a second inverter as the inverter wherein the first inverter is configured to output alternating current electric power to the first electric motor and the second inverter is configured to output alternating current electric power to the second electric motor,
a first direct current wire and a second direct current wire as the direct current wire wherein the first direct current wire is configured to connect the power control unit and the first inverter and the second direct current wire is configured to connect the power control unit and the second inverter, and
a first alternating current wire and a second alternating current wire as the alternating current wire wherein the first alternating current wire is configured to connect the first inverter and the first electric motor and the second alternating current wire is configured to connect the second inverter and the second electric motor,
wherein
alternating current electric power output from the generator is converted into direct current electric power at the power control unit, and the direct current electric power output from the power control unit is converted into alternating current electric power at the first inverter and is supplied to the first electric motor, and
the alternating current electric power output from the generator is converted into the direct current electric power at the power control unit, and the direct current electric power output from the power control unit is converted into alternating current electric power at the second inverter and is supplied to the second electric motor.

* * * * *